May 5, 1931. E. A. SPERRY 1,804,380
FISSURE DETECTOR FOR STEEL RAILS
Filed Aug. 27, 1927 4 Sheets-Sheet 1

INVENTOR
ELMER A. SPERRY
BY
Herbert H. Thompson
their ATTORNEY.

INVENTOR
ELMER A. SPERRY

Patented May 5, 1931

1,804,380

UNITED STATES PATENT OFFICE

ELMER A. SPERRY, OF BROOKLYN, NEW YORK, ASSIGNOR, BY MESNE ASSIGNMENTS, TO SPERRY PRODUCTS, INC., OF BROOKLYN, NEW YORK, A CORPORATION OF NEW YORK

FISSURE DETECTOR FOR STEEL RAILS

Application filed August 27, 1927, Serial No. 215,980, and in Great Britain July 22, 1927.

This invention relates to automatic means for detecting flaws or hidden fissures in metal bars, rails and the like and has especial application to the detection of such flaws in railway rails either before or after they have been laid in the track. It is now thought that such flaws in very small form as shatter cracks are occasionally present in the rail as it comes from the rolling mill and that the passage of the trains and heavy locomotives gradually increases the size of the fissure or flaw until the rail actually breaks, which, of course, on mainline tracks results in a derailment and many times in a serious wreck.

The purpose of the present invention is to devise a testing apparatus for rails of such sensitivity and selectiveness that it will detect and indicate or record the fissure before it has reached a dangerous size and will not be affected by or indicate (at least in a manner to be confused with the flaw indications) variations in the voltage supply or current flowing through the rail or poor contact of either the main or detector brushes with the rail.

According to this invention the testing apparatus consists essentially of means for passing a heavy electric current through the rail or the particular portion under test and providing means contacting with the rail head for detecting minute variations in the voltage drop in the rail head as the apparatus and rail are moved relatively, together with a highly sensitive means for amplifying the variations thus obtained and operating therefrom a recording device or indicator. Such amplifying means preferably takes the form of a cascade system of thermionic tubes arranged to operate a relay for controlling or operating an indicator such as a recording pen on a chart, a defect rail marker to mark a bad rail at the flaw, a signal or the like. The detector and amplifier are constructed in such a manner that variations in the supply voltage or current supplied to the rail does not make an indication which could be confused with the flaw indication. This may be accomplished either by constructing the apparatus so that no indication at all is recorded by such causes or so that a different character of indication is made from such causes as compared to the indication caused by the flaw.

In the first mentioned case, three or more detecting brushes are employed in each group in combination with a balanced transformer or balanced resistances, so that when a variation in the main current flowing occurs, equal and opposite effects are produced simultaneously between the first and second brushes and the second and third brushes, resulting in no indication being transmitted. In the case of a flaw, however, a dissimultaneous variation is produced in the circuit as it passes successively between the first and second brushes and between the second and third brushes, resulting in two indications being transmitted. In the second case, a plurality of pairs of detector brushes are employed with a plurality of recording pens on a traveling chart, the pens being so arranged that when a flaw is encountered successive marks are made on the paper in a predetermined arrangement, such as straight across the chart, while for variations in the current supply, due to any cause, the indications are staggered or in different relative positions than for the flaw.

In case my invention is employed for detecting flaws in laid track, I prefer to employ a test car which itself supplies a heavy current to the track by heavy brushes positioned on each side of and preferably close to the detector brushes. If it is desired to prevent the car from interfering with the block signalling system an additional pair of brushes can be provided on the outside of the current supply brushes and connected by a heavy copper conductor. Where my invention is employed on rails before being laid, the rails may be mounted on a carriage and automatic means provided operated from the flaw detector for rejecting or separating out defective rails which may comprise an electro-magnetic trip operated from the relay of my flaw detector system which drops the defective rail onto a separate carriage.

When used on laid track, the rail joints also will be indicated so that it is desirable to distinguish between the rail joints and the flaws. Since the voltage drop variation is very much greater for a rail joint than for a flaw, the size of the rail joint indication furnishes a ready means for distinguishing between the two. In addition relays of different degrees of sensitivity may be employed for this purpose, a relatively insensitive relay being set so that it is only operated for the rail joints and not for the flaws. This relay may also operate a rail counter. Also by making the relays of different degrees of sensitivity the relative size of the flaw may be indicated. For instance, for a small flaw only a very sensitive relay would be operated, for a larger flaw two relays, the very sensitive one and a less sensitive one, and for a rail joint, the least sensitive relay as well as the two more sensitive ones.

This application is a continuation of my co-pending application Serial No. 681,718 for flaw detector for rails, filed December 20, 1923.

Referring to the drawings in which several forms of the invention are shown:

Fig. 4 is a plan view of the recording pen adapted to be employed with the form of the invention shown in Figs. 9 to 11 and 17.

Fig. 4—a is a side elevation of the same.

Fig. 5 is a wiring diagram showing a modified form of detecting circuit but using the same arrangement of brushes as Fig. 3.

Fig. 6 is a diagrammatic view showing how my apparatus may be used to test rails in the steel mill before laid in the track.

Fig. 7 is a detail of said apparatus showing a trip for separating out defective rails.

Fig. 8 is a detail of a portion of Fig. 7 showing a clamp for introducing current into the rails.

Figure 1:
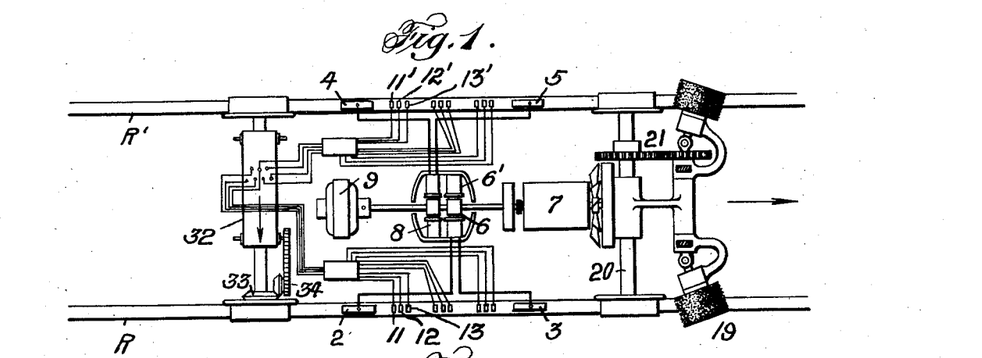
Fig. 1 is a diagrammatic plan view of a rail test car adapted to be moved over the track after the rails are laid and having my invention embodied therein.
Figure 2:
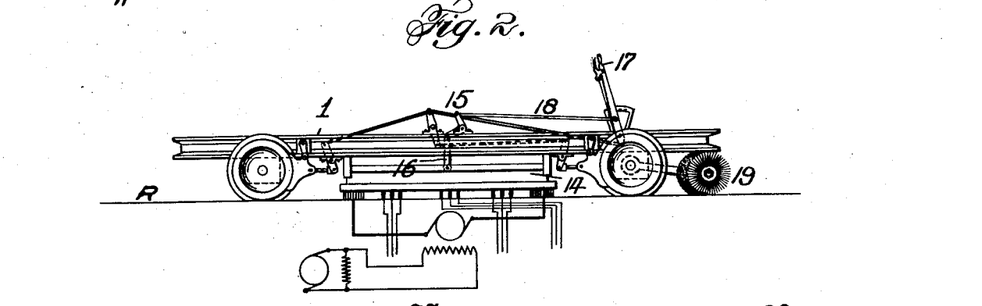
Fig. 2 is a side elevation of the same.

For detecting flaws in laid track, I prefer to utilize a car 1 which itself contains means for supplying a heavy current to the rails. Current is shown as supplied to each rail R and R' through heavy brushes 2, 3, 4 and 5, to which is connected a heavy current low voltage generator 6 which may be driven by a combustion or other engine 7 on the test car. Separate windings 6' and 8 are shown as provided for the two rails. The fields of both generators may be excited by a separate exciter 9 if desired. Between said heavy brushes I place one or more groups of detector or potentiometer brushes 11, 12 and 13 and 11', 12' and 13', which are designed to detect the slightest variation in voltage drop in the rail head between the brushes of each group. These contacts may be of any suitable form such as small rollers, woven wire brushes or the like. The entire set of brushes, both large and small, may be mounted on a common frame 14, which may be raised and lowered by any suitable means, such as a bell crank lever 15 connected to the frame by connecting link 16 and connected at its other end to an operating handle or lever 17 through link 18. Rail cleaning brushes 19 may also be provided to assure good contact with the rail. Said brushes may be revolved from the car axle 20 as by means of the gearing 21 there shown.

Figure 3:
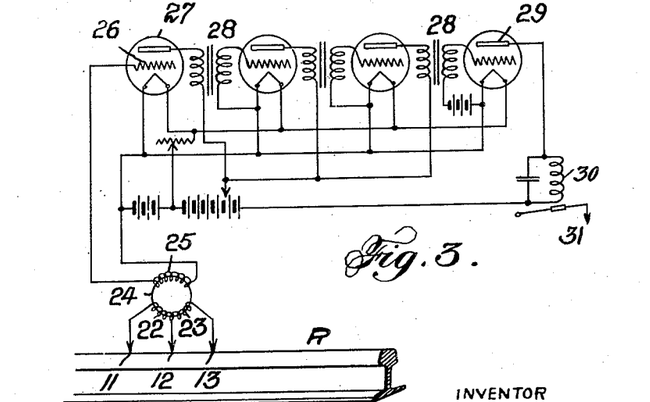
Fig. 3 is a wiring diagram showing one form of a detecting and amplifying circuit for actuating the relay indicator.

According to the detecting system in Fig. 3, which illustrates a system for one group of brushes, three detector brushes 11, 12 and 13 are employed, said brushes being connected to oppositely wound coils 22 and 23 on a Faraday transformer 24. As shown, the brush 12 is connected to a neutral point between the two coils 22 and 23. The two coils are wound so that they are equal and opposite in their magnetic influence on the transformer ring 24. The secondary winding 25 on said ring is connected to an amplifying system (hereinafter described) for operating the recorder or indicator. In case a fissure is passed over when said fissure is between brushes 12 and 13, a change of current flow will be effected in the coils 22 and 23 in one direction, and as the fissure passes under brushes 11 and 12 a change of current in the transformer windings will be effected in the opposite direction so that a fissure will be indicated by two successive impulses. In case, however, of variation in the current passing through the rail due to any cause, such as a poor contact condition between the main brushes and the rail, jumping of the main brushes off the rail, or any other cause, these two coils will act equally, oppositely and simultaneously on the transformer and, therefore, no indication will be produced.

The feeble indication produced by a flaw in the secondary winding 25 is amplified many times by placing the coil in electrical relation with a thermionic cascade amplifying system of the alternating current type in which the coil 25 is placed in circuit with the grid 26 of No. 1 tube 27. Variations of the potential of the grid of this tube relative to the filament govern the other tubes of the amplifying system. Between each tube is shown a suitable form of audio-transformer 28. The plate 29 of the last tube is in circuit with the relay coil 30 of the indicating or recording mechanism.

As shown, such mechanism is in the form of a recorder in which the said winding actuates a marker mechanism or pen 31 making an indication on the chart when a flaw is encountered. The chart 32 (Fig. 1) is shown as continuously actuated from the car wheels as by means of bevel gearing 33 and a sprocket and chain 34. The chart, therefore, is advanced in exact proportion to the passage of the car over the track, so that the chart record is "synchronized" with the track and the location of a flaw may be scaled off on the chart from the adjacent rail joint. Each pen or marker mechanism (Figs. 13 and 14) is shown as comprising a frame-work 35 supporting an electro-magnet 36 and a spring arm 37 which carries at its free end a U-shaped pen 38, the inner end of which dips into an ink trough or well 39 (Figs. 13 and 15). The pens may be mounted adjacent one another with the magnets staggered, as shown in Fig. 14 so that a compact arrangement is produced.

Figures 13, 14, 15, 16, 17, 18:
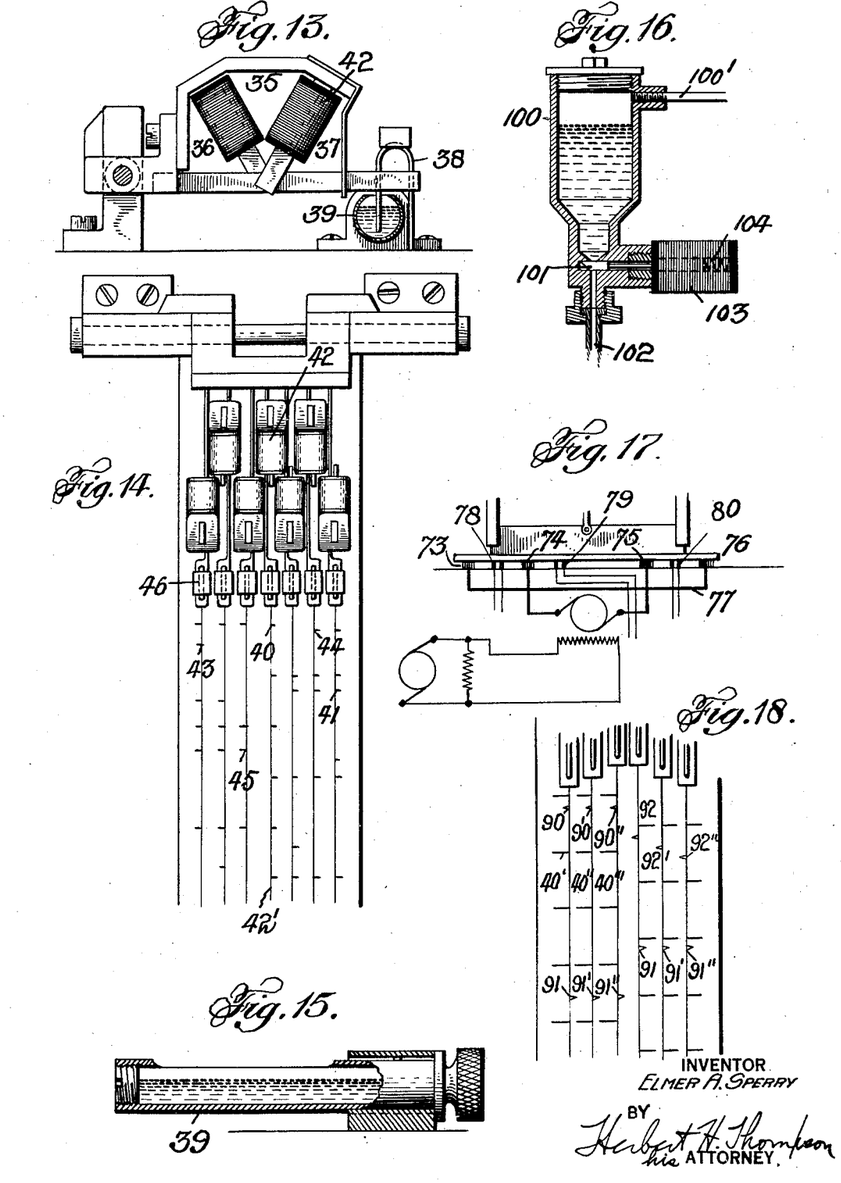
Fig. 13 is a side elevation of a form of marking pen for recording the flaws on a chart.
Fig. 14 is a plan view of the same showing the character of the chart record.
Fig. 15 is a detail in section of the ink trough for the pens.
Fig. 16 is a vertical section of the rail marking device
Fig. 17 is a side view of a modified form of brush holder especially adapted for the form of circuit shown in Figs. 9 to 11.
Fig. 18 shows the character of indication made by this form of the invention.

The apparatus is further designed so that the rail joints, when passed over, make readily distinguishable indications 40 from the flaw indications 41 (Fig. 14). This not only avoids confusing the rail joints with the flaws but also enables the position of the flaw to be determined on the track by counting the rail joints from a given point.

The several relays 30 or magnets 36 are, for this and other purposes, wound for different degrees of sensitivity. At least one magnet or relay 42, for instance, is relatively insensitive so that it is only actuated for rail joints, and in this instance is connected to both rails. All marks on center line 42' of the chart, therefore, indicate rail joints.

The other relays are preferably more sensitive, one half being connected to one rail and the other half to the other rail, but their sensitivity may also be made different so that for a very small flaw, for instance, only one relay would be actuated, for a larger flaw two relays, and a serious flaw by all three marks. Thus the indications on the chart show at a glance the relative size of the fissure as well as its presence. Referring to Fig. 14, for instance, rail joints are shown at 40, because pen 42' is adjusted only to be actuated by such, and a very small fissure in the left hand rail is shown at 43 because only the super-sensitive pen 46 is actuated by such a small flaw, and a larger flaw at 44 in the right rail and a very serious flaw at 45 in the left rail and at 41 in the right rail.

Figures 4, 4A, 5, 6, 7, 8:
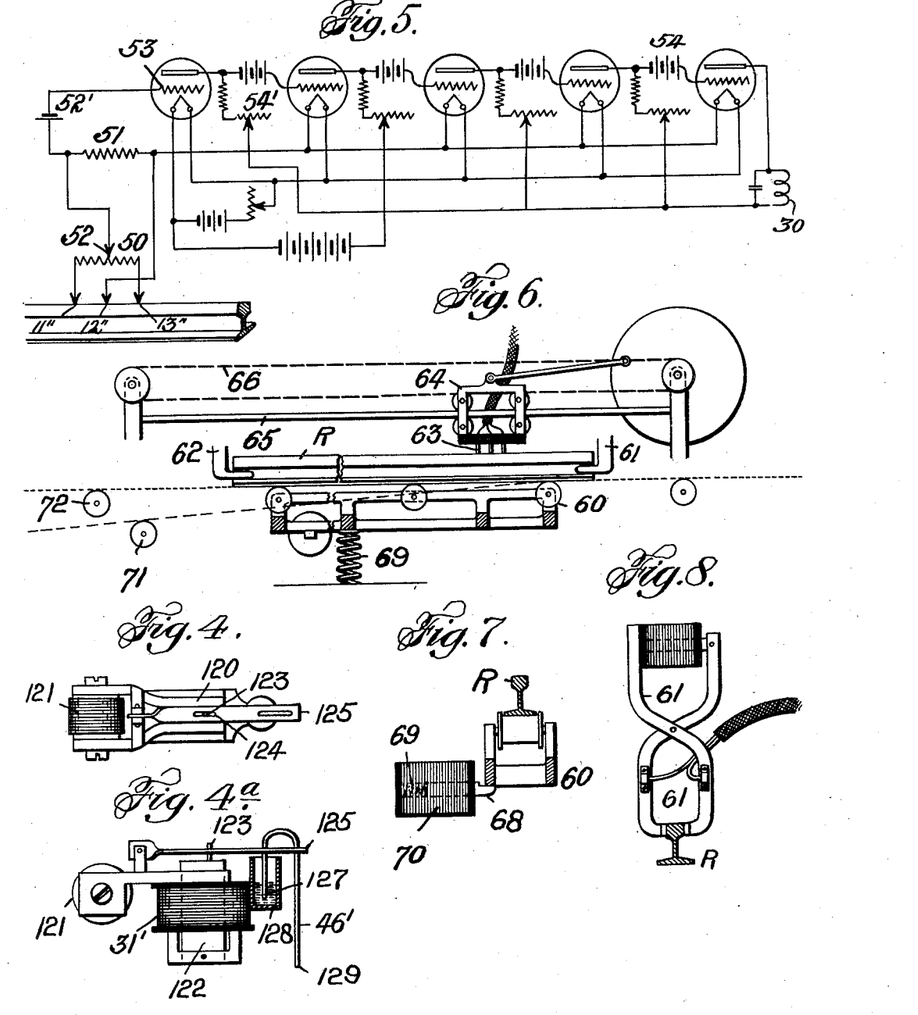

In Fig. 5 is shown a different flaw detecting and amplifying system. Instead of employing a balanced transformer for eliminating disturbances due to current variations, etc., I here employ a system of balanced resistances for this purpose. In this system the three detector contact brushes 11", 12" and 13" are placed in circuit with a pair of variable resistances 50 and 51 as shown, the tap 52 in resistance 50 being so adjusted that when the potential drop through the rail head is uniform then no current will flow through the other resistance 51, since the voltage drop between brushes 11" and 12" equals that between 12" and 13". When, however, a flaw is passed over by brushes 11" and 12", the voltage drop increases resulting in a current flow in one direction through resistance 51 and when the flaw passes brushes 12" and 13", the current flow through resistance 51 is reversed. The last-named resistance is preferably connected through a C battery 52' to the grid of the first tube 53 of a D. C. cascade amplifying system. In this system I have shown separate "C" batteries 54 for the plate of each tube with a variable resistance 54' for adjusting the charge.

Instead of moving the car along the track, it is obvious that the relative motion between the detector brushes and the rail may be produced by other means. For instance, if it is desired to test the rail at the steel mill or at any time before it is placed in the track, apparatus such as shown in Fig. 6 may be conveniently employed. According to this apparatus the rail R is run onto a carriage 60, and current is introduced thereto preferably by electro-magnetic clamps 61 and 62 gripped to each end of the rail head. The detector brushes 63 may then be caused to travel along the rail head by any suitable means, such as by having them supported in a carriage 64 rolling on overhead track-way 65 and moved as by being linked to a travelling belt or chain 66 driven by any suitable power source (not shown).

If desired, automatic means may be provided for rejecting a rail in which a flaw has been detected. One method of accomplishing such results is suggested in Figs. 6 and 7 wherein the carriage supporting the rail is shown as hinged at one end and supported at the other end by a retractable latch 68 and coil springs 69. Said latch is shown as operated by solenoid 70, which, when actuated, withdraws the latch, thus allowing the left-hand end of the carriage to descend against the action of the spring 69. This will slide the rail down onto rollers 71 below the regular rollers 72 for the perfect rails and, therefore, bring about the separation of the imperfect rails from the perfect rails. As the rail slides off the carriage and thus relieve it of its weight, the springs 69 return the carriage to its normal position where it is again caught by the latch.

Another system of introducing current to the rail is shown in Fig. 17. In this system four heavy brushes are employed, 73, 74, 75 and 76, the generator being connected to the two inside brushes and the outside brushes being cross-connected by a heavy copper bar 77 of low resistance. If the current then enters through brush 74 it will divide, half of the same flowing through the rail to brush 75, and the other half flowing in the opposite direction through the rail to brush 73, thence through copper conductor 77 to brush 76 and thence back to brush 75, the spacing between brushes 74 and 75 being equal to the combined distance between brushes 73 and 74 and brushes 75 and 76. By this means and by insulating the wheels on one side of the car from those on the other, leakage of current into the block signal system of the railroad and operation of the signals by the car is prevented, since the two outside brushes 75 and 76 prevent any current from leaking beyond the car. Besides, this enables one to tap the rail at three points, i. e., between brushes 73 and 74, 74 and 75, and 75 and 76, with the employment of only one generator, as shown by pairs of detector brushes 78, 79 and 80. Between each pair of supply brushes as aforesaid, I place a pair of exploring or potentiometer contacts 78, 79 and 80 for very accurately detecting any variation in voltage drop in the small sections of the rail between the members of each pair of contacts.

Figures 10, 11, 12:
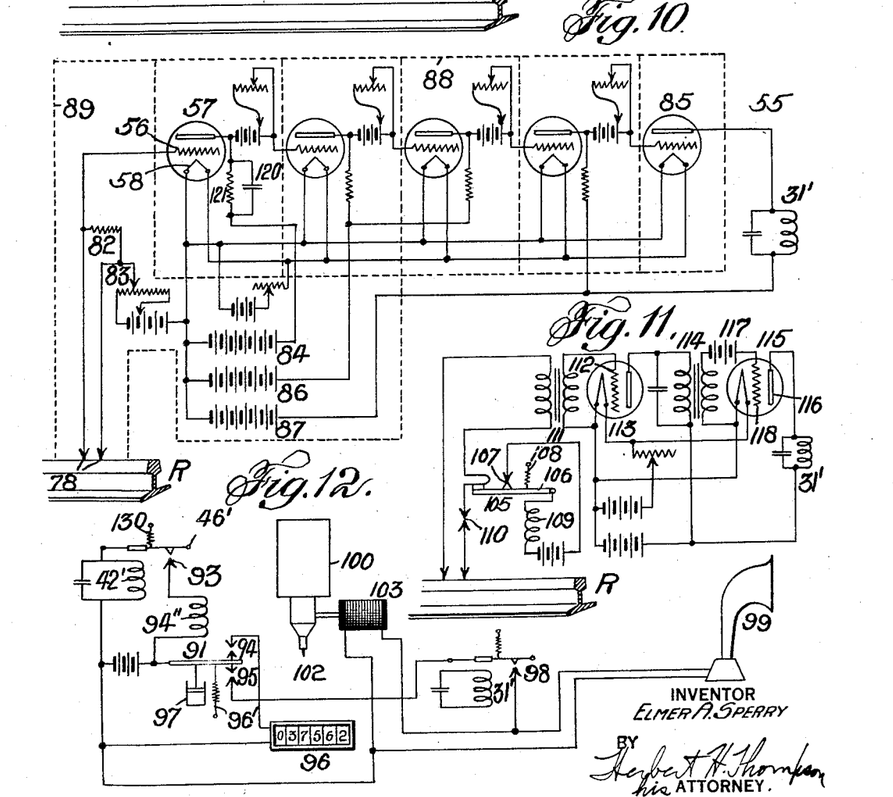
Fig. 10 shows a D. C. amplifying circuit with a similar contact system to Fig. 9.
Fig. 11 shows another form of A. C. amplifying system.
Fig. 12 shows in diagrammatic form how my invention may actuate other forms of indicators besides recorders, comprising a rail marker, an audible signal, and a rail joint counter.

Fig. 10 represents a preferred means for amplifying the variation in voltage drop between the members of the pairs of contacts when a flaw is passed over. Said contacts are placed in electrical relation with a cascade amplifying system 55 of the thermionic direct current type in which the contacts are placed so as to charge the grid 56 of No. 1 tube 57 with a (say) negative potential, the variations in the potential of the grid of this tube relative to the filament 58 governing the other tubes of the amplifying system. The more negative the grid potential becomes with respect to the filament, the lower the output of the amplifier.

If, however, no further means is employed, the output of the system will increase to a very large figure if the contact between the brushes 78 and the rail becomes poor, or in case the brushes 78 bounce off the rail, thereby reducing the negative potential to zero. To correct this difficulty a resistance 82, on the order of 100,000 (more or less) ohms, is inserted across the brushes 78 and a variable potentiometer 83 is provided which may be adjusted to give a predetermined output for the difference in potential drop due to the potentiometer and that due to the rail between the brushes 78. If any flaw is encountered, the drop of potential at the rail increases and, therefore, the difference between the potential drop of the potentiometer and rail becomes smaller so that the output increases to actuate the indicator, but if the brushes bounce from the rail or bad contact is encountered, the drop at the rail becomes or approaches zero, and, therefore, the total potential increases and the output drops toward or to zero, resulting in an indication of a different character from that caused by a flaw.

Preferably also separate "B" batteries are provided for some or all of the tubes. If, for instance, the same "B" battery 84 were used for the last tube 85 as for the others any increase in flow of current therethrough would cause a drop in voltage of the B battery and, therefore, a drop in voltage supplied to the plates of other tubes resulting in the rapid building up of an unstable condition. With a separate "B" battery 86 and 87 for the other tubes, this trouble is avoided. Each unit of the amplifying system of all forms of the invention is preferably shielded as by metallic coverings 88, such covering also extending to the wires leading to the brushes 78—79—80, as indicated at 89, so that outside electrical influences are carefully excluded. The last tube is connected directly or indirectly to the electro-magnet 42' of a recording pen 46' (Figs. 4 and 12). Each pen or marker mechanism is shown as comprising a U-shaped magnet 120 (Figs. 4 and 4—a), a magnetizing coil 121 which may have current continuously supplied thereto, and said coil 42' in circuit with or controlled by the amplifying system.

An armature in the form of a spring plate 122 pinned at its base projects through said last-named coil and up between the ends of said U-shaped magnet, the armature being preferably of soft iron and having a pin 123 engaging a slot 124 in the reed 125 which holds the pen 46'. Said pen is shown as dipping at one end 127 into an inkwell 128 and at the other end 129 as bearing on the chart. As the winding 31' is excited the soft iron armature becomes polarized and is pulled towards one pole or the other of the permanent magnet as will be readily apparent, with a force proportional to the current flowing and against the spring bias of the plate 122, which is represented in Fig. 12 by spring 130.

As explained above, if a flaw is encountered, the pen will be pulled in one direction to cause mark 90, and if bad contact is encountered or the potentiometer brushes bounce from the rail, the pens will be pulled in the opposite direction to cause marks 91, 91′ and 91″ as the current through coil 31′ will then decrease instead of increase.

The pen will also be actuated at each rail joint as shown at 40′, 40″ and 40‴, but the rail joints will actuate the pens to a much greater extent than the flaws and also be more sharply defined, so that their markings may be readily distinguished from those caused by flaws on the chart. It will be understood that each set of brushes 78, 79 and 80 is connected to a separate amplifying system and pen so that as shown there are three pens for each rail, each pen tracing a separate line on the chart and giving an indication 90, 90′ and 90″, of the flaw as the connected pair of brushes pass over the same. This not only gives a triple check on the flaw but also furnishes an additional means for distinguishing between a flaw and a case where the entire brush system 73, 74, 75 and 76 bounces off the rail, the case of non-contact with the rail, above considered, being where the detecting brushes 78, 79 or 80 lose contact successively with the rail. The pens may be so arranged on the chart in staggered relation, as shown in Fig. 18, that for a flaw the markings 90, 90′ and 90″ or 91, 91′ and 91″ on the chart appear in the same straight line across the same (Fig. 18). Where, however, the entire brush mechanism is bounced off the rail, the markings of the pen will be in staggered relation 92, 92′ and 92″, the three pens marking simultaneously but the markings appearing in staggered relation as the brushes are placed in staggered relation on the chart.

In addition to or instead of making a record of the flaws, I may provide other signalling means. In Fig. 12, for instance, I have shown both a means for giving an audible signal when a flaw is encountered and also a means for marking a defective rail at a point near the flaw. In this figure the pen mechanism is again shown at 46′. An extra contact 93 is provided thereon which is so spaced as normally not to be closed by ordinary flaws, but which is closed by the greater effect caused by the rail joint. As the pen moves in the opposite direction, when contact is lost or poor, said contact and also contact 98 (hereinafter described) are not closed under such conditions. When closed said contact excites a relay coil 94 which controls an armature 91 having two sets of contacts 94 and 95. The upper contact 94 is closed by excitation of said coil 94′ and is in circuit with a counter 96 or the like which counts the rail joints so that the defective rail may be located by counting the number of rails from a given point. Said contacts 94, however, are normally maintained open by a spring 96′ and dashpot 97. The back contacts 95 are in circuit with another pair of contacts 98 which is controlled by the relay coil 31′ of the second or third pair of brushes 79 or 80. This set of contacts when closed at the time the first set is closed will actuate the loud-speaker 99 and preferably also the rail-marking device 100. From this it will be seen that for an ordinary flaw the loud-speaker and marking-device will be operated because both the contacts 98 and 95 will be closed, since contact 93 is not closed, by reason of the insufficient movement of the pen. However, for rail joints, since contact 93 is closed, the loud-speaker will not be operated as when contact 93 is closed the back contacts at 95 will be open, and the contacts 94 through the counter 96 closed. For bad contact conditions, also, no operation will occur as both contacts 93 and 98 remain open.

As shown, the rail-marking device is in the form of a paint-daubing device (Fig. 16). Paint is placed in the container 100 to which is connected a source of compressed air through the pipe 100′. A valve 101 is placed in the outlet pipe 102 which is normally maintained closed but which is opened by means of an electro-magnet or solenoid 103 connected to the slide valve 101, so that when the electro-magnet is excited, the valve will be momentarily opened and a splotch of paint splashed on the rail, the valve being closed again by spring 104.

Other forms of amplification may obviously be used for amplifying the feeble variations in voltage drop at the relay to actuate the indicator or signal. In Fig. 11 I have shown a transformer type of radio amplifier as distinguished from the non-inductive type, such as shown in Fig. 10. According to this modification, a means is interposed for introducing a high frequency interruption of the primary circuit to render the use of the transformer type feasible. Such an interrupter is indicated at 105 and comprises an armature 106 normally biased to close back contacts 107 by means of the spring 108. A coil 109 in circuit with switch 107 attracts the armature 106 to close contacts 110, which is in the primary circuit. It will be understood that this contact device will vibrate rapidly to make and break the primary circuit. In said circuit is placed a transformer 111, the secondary being connected to the grid 112 of the first tube 113. From this point on any number of stages may be added as indicated by the transformer 114, and tube 115, the last tube having its plate 116 in circuit with the relay 31′ as in the system described in connection with Fig. 10. It will be understood that in such a system the "C" battery 117 is adjusted to give a bias on the grid 118 of the last tube such that the relay only operates with a greater than normal variation due to the rail flaw or the like.

Figure 9:
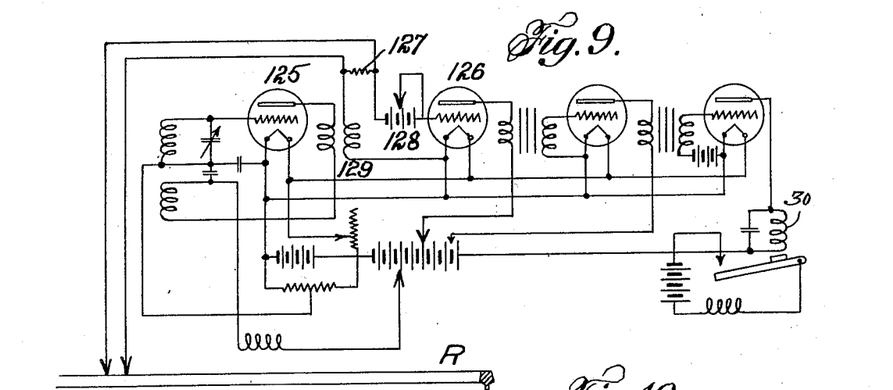
Fig. 9 is a wiring diagram of a modified form of the invention employing contact brushes in pairs and an A. C. amplifying system.

In Fig. 9 is shown a somewhat different type of alternating current, oscillatory amplifying system than shown in Fig. 11. In this system the first tube 125 is an oscillator, and the second tube 126 is the detector, the circuit being modulated by the rail drop then passed over. Two stages of transformer amplification are shown beyond the detector. It is obvious that a crystal or piezo electric detector may be employed in place of the detector tube 126 if desired. In this system, the detector brushes are placed in circuit with a resistance 127, "C" battery 128, and the grid of the detector tube 126, and also one side of the transformer 129, the other winding of which is connected to the plate of the oscillator.

In passing, it should be observed that I prefer to position the pair of potentiometer contacts 79 between supply current brushes 74 and 75 closer to one brush than the other. This is because I have found that the heavy supply current spreads out to the web and base of the rail at more than a few inches away from its point of supply, so that a large part of it does not pass through the rail head, where the fissures occur. I, therefore, position the potentiometer contacts not more than a few inches away from a supply brush. Also, I prefer to employ means in the amplifier circuit (Fig. 10), such as condenser 120 shunted around resistance 121 to suppress oscillations of radio frequency so that only oscillations of much less frequency, such as occasioned by rail flaws, reach relay 31'.

It will be obvious that if desired a rail marking device, such as shown in Fig. 12, may also be employed to mark every tenth rail or rail-joint (for instance) so that after the test car has passed over the defective rail may be readily located, even though the flaw itself is not marked. This may be accomplished by exciting solenoid 103 from a contact (not shown) on rail counter 96 or in any other suitable manner.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desired to secure by Letters Patent is:

1. Apparatus for detecting flaws in metallic bars, rails or the like comprising means movable relatively to the rail for detecting minute variations in the flow of current from point to point through the rail, means for amplifying such variations to give an indication of the flaw, and means for rendering separate indications for the rail joints.

2. In a flaw detector for metallic bars, rails or the like, means for passing a current through the bar being tested, means relatively movable along the bar for detecting variations in the voltage drop from point to point, and means for amplifying and recording such variations.

3. In a flaw detector for metallic bars, rails or the like, means for passing a current through the bar being tested, means relatively movable along the rail for detecting variations in the voltage drop from point to point, means for amplifying such variations, and means for differentiating between large and small variations whereby large flaws may be distinguished from small flaws.

4. In a flaw detector for metallic bars, rails or the like, means for passing a current through the rail being tested, means relatively movable along the rail for detecting variations in the voltage drop from point to point, means for amplifying such variations, means for differentiating between large and small variations whereby the rail joints may be distinguished from the flaws, and means for recording distinctively the flaws and rail joints.

5. The combination with a car, a traveling chart thereon, a plurality of recording pens therefor, electrical contact means for measuring the rail conductivity from point to point as the car moves along the rail, means for moving each pan successively as a point of high electrical resistance in the rail is passed over by the car, and means for moving said pens simultaneously as said contact means loses contact with the rail.

6. The combination with a car, a traveling chart thereon, a plurality of recording pens therefor, electrical contact means for measuring the rail conductivity from point to point as the car moves along the rail, means for moving each pen as a point of high electrical resistance in the rail is passed over by the car, and means for moving said pens in a different manner as said contact means loses contact with the rail.

7. A rail flaw detector comprising a plurality of spaced contacts adapted to be moved along the rail, means for supplying a current to the central two of said contacts, a low resistance conductor between the outer two of said contacts, a pair of detector contacts between each adjacent pair of current-carrying contacts, means for detecting variations in voltage drop between the members of each detector pair, and means for amplifying the variation detected by each to furnish a plurality of indications when sudden variations in voltage drop occur.

8. In a rail flaw detector, the combination with means for supplying current to the rail, of a plurality of contacts, means for moving the rails and contacts relatively to each other, a circuit connected to said contacts which is balanced as long as the rail voltage drop between any two of the contacts is the same as that between the other two contacts but in which a current flow is caused when a variation in said voltage drop occurs, and means for amplifying said flow to cause an indication.

9. In a rail flaw detector, the combination with means for supplying current to the rail, of a plurality of contacts, means for moving the rails and contacts relatively to each other, a resistance circuit connected to said contacts which is balanced as long as the rail voltage drop between any two of the contacts is the same as that between the other two contacts but in which a current flow is caused when a variation in said voltage drop occurs, and means for amplifying said flow to cause an indication.

10. In a rail flaw detector, the combination with means for supplying current to the rail, of a plurality of contacts, means for moving the rails and contacts relatively to each other, a multi-winding transformer connected to said contacts in which no current E. M. F. is generated in the secondary as long as the rail voltage drop between any two of the contacts is the same as that between the other two contacts, but in which an E. M. F. is caused when a variation in said voltage drop occurs, and means for amplifying said E. M. F. to cause an indication.

11. In a flaw detector for metallic bars, rails or the like, means for passing a current through the rail being tested, means movable relatively along the rail for detecting variations in the current flow at different progressive points, means for amplifying such variations, and means for progressively recording such amplified variations.

12. In a flaw detector for metallic bars, rails or the like, means for passing a current through the rail being tested, means movable relatively along the rail for detecting variations in the voltage drop at different progressive points, means for amplifying such variations, and means for progressively recording such amplified variations and indicating their relative magnitude.

13. In a detector car, a travelling chart thereon, a recording pen therefor, means on the car for supplying a current to the rail as the car passes therealong, electrical means on the car for detecting variations in the current flow through the rail from point to point as the car passes therealong, means for amplifying such variations, and means actuated thereby for moving said pen.

14. In a detector car, a travelling chart thereon, a recording pen therefor, means on the car for supplying a current to the rail as the car passes therealong, electrical means on the car for detecting variations in the current flow through the rail from point to point as the car passes therealong, means for amplifying such variations, means actuated thereby for moving said pen, and means for preventing like actuation of the pen caused by variations in the main current supply through the rail.

15. In a flaw detector for metallic masses, means movable relatively to the mass for passing a current through the mass between spaced points, means movable relatively to the mass for detecting variations in the characteristics of current flow between said points, and means for preventing variations in the said current from affecting said detecting means.

16. In a flaw detector for metallic masses, means movable relatively to the mass for passing a current through the mass between spaced points, means mechanically coupled to and moving with the said current passing means relatively to the mass for detecting variations in the characteristics of current flow between said points, and means for preventing variations in the said current from affecting said detecting means.

17. In a flaw detector for metal bars, rails or the like, contact means movable along the bar for passing a current through the bar between spaced points, means also movable with said first named means for detecting variations in the characteristics of current flow between said points, means for amplifying variations so detected, and means actuated thereby to indicate the location of flaws.

18. In a flaw detector for metal bars, rails or the like, a source of electrical current, means movable relative to the bar for introducing said current into the bar between spaced points as said bar and means move relatively, a plurality of means for shunting a portion of the current passing between each pair of spaced means, and a common means for indicating variations in the current shunted through said second means for the purpose specified.

19. A flaw detector comprising a car, a plurality of contacts on the car adapted to contact with the rail, means for passing through the rail between certain of said contacts a current, certain other of said contacts being located between the first named contacts and adapted to furnish a shunt path for said current, a circuit actuated by variations in the current passing through said second named contacts, and means for amplifying said variations for indicating flaws.

20. In a rail flaw detector, a chart, a plurality of spaced markers for making duplicate records on the chart and a plurality of detector contactors adapted to successively pass over the rail, the spacing of the markers on the chart being such that the distinctive mark of one marker for a given flaw or joint will lie in line with the distinctive mark of the other marker for the same flaw or joint.

21. In a rail flaw detector, a chart, a plurality of spaced markers for making duplicate records on the chart and a plurality of detector contactors adapted to successively pass over the rail, the spacing of the markers on the chart being such that the distinctive mark of one marker for a given flaw or joint will bear a predetermined relationship on the chart to the distinctive mark of the other marker for the same flaw or joint.

22. In a detector car, a traveling chart thereon, a plurality of recording pens therefor, electrical contact means for measuring the rail conductivity from point to point, means for moving each pen successively as a point of high electrical resistance in the rail is passed over by the car, and means for moving said pens simultaneously as said contact means loses contact with the rail.

23. In a detector car, a traveling chart thereon, a plurality of recording pens therefor, electrical contact means for measuring the rail conductivity from point to point, means for moving each pen as a point of high electrical resistance in the rail is passed over by the car, and means for moving said pens in a different manner as said contact means loses contact with the rail.

24. In a flaw detector for metal bars, rails and the like, means contacting with said bar and movable relative to the bar for passing a current through the bar between spaced points, and means also contacting with said bar and movable relative to the bar for detecting variations in the characteristics of current flow between said points.

25. In a flaw detector for metallic bars, rails and the like, means for passing a current between spaced points of said bar, means movable relatively to said bar for detecting variations in the current flow from point to point, and flaw-indicating means actuated by said detecting means.

26. A rail flaw detector comprising a plurality of spaced contacts adapted to be moved along the rail, means for supplying a current thereto, a pair of contacts between said first-named contacts, means for detecting variations in the voltage drop therebetween, means for amplifying such variation, and means actuated thereby for furnishing an indication of sudden increases thereof.

27. A rail flaw detector comprising a plurality of spaced contacts adapted to be moved along the rail, means for supplying a current to the central two of said contacts, a low resistance conductor between the outer two of said contacts, a pair of detector contacts between each adjacent pair of current-carrying contacts, means for detecting variations in voltage drop between the members of each detector pair, means for amplifying the variations detected by each, and means actuated thereby for furnishing a plurality of indications when sudden variations in voltage drop occur.

28. A rail flaw detector comprising a plurality of spaced contacts adapted to be moved along the rail, means for supplying a current to the central two of said contacts, a low resistance conductor between the outer two of said contacts, a pair of detector contacts between each adjacent pair of current-carrying contacts, means for detecting variations in voltage drop between the members of each detector pair, means for amplifying the variations detected by each, a traveling chart, and recording means therefor actuated by each of said amplifying means.

29. A rail flaw detector comprising a plurality of spaced brushes adapted to be moved along the rail, means for supplying electric current thereto, a pair of contacts between said brushes, means differently responsive to variations in the voltage drop due to flaws in the rail than those due to loss of electrical contact with said rail by said contacts, means for amplifying said different responses, and indicating means operated by said amplifying means.

In testimony whereof I have affixed my signature.

ELMER A. SPERRY.